United States Patent
Gwon et al.

(10) Patent No.: US 11,530,957 B2
(45) Date of Patent: Dec. 20, 2022

(54) METHOD FOR PREDICTING CLAMP FORCE USING CONVOLUTIONAL NEURAL NETWORK

(71) Applicants: HYUNDAI MOTOR COMPANY, Seoul (KR); KIA MOTORS CORPORATION, Seoul (KR); INDUSTRY-UNIVERISTY COOPERATION FOUNDATION HANYANG UNIVERSITY, Seoul (KR)

(72) Inventors: Jae-Soo Gwon, Yongin-si (KR); Gyung-Min Toh, Seoul (KR); Wan-Seung Kim, Mokpo-si (KR); Jun-Hong Park, Seongnam-si (KR)

(73) Assignees: HYUNDAI MOTOR COMPANY, Seoul (KR); KIA MOTORS CORPORATION, Seoul (KR); IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 446 days.

(21) Appl. No.: 16/691,308

(22) Filed: Nov. 21, 2019

(65) Prior Publication Data
US 2020/0191667 A1   Jun. 18, 2020

(30) Foreign Application Priority Data
Dec. 13, 2018  (KR) .................. 10-2018-0160834

(51) Int. Cl.
*G01L 1/24*         (2006.01)
*G06K 9/00*        (2022.01)
(Continued)

(52) U.S. Cl.
CPC ............. *G01L 1/24* (2013.01); *G06K 9/00503* (2013.01); *G06K 9/00523* (2013.01);
(Continued)

(58) Field of Classification Search
CPC ........... G06T 2207/10024; G06T 2207/20016; G06V 10/30; G06V 10/454; G06V 10/82;
(Continued)

(56) References Cited

U.S. PATENT DOCUMENTS 6,687,657 B2 *  2/2004  Levin ................... G01D 18/00
                                                  702/198
6,990,252 B2 *  1/2006  Shekter ................ G06T 5/20
                                                  358/463

(Continued)

FOREIGN PATENT DOCUMENTS

KR          10-0317522 B1      6/2002
KR          10-0411094 B1     12/2003
KR     10-2009-0015359 A       2/2009

*Primary Examiner* — Jeffrey P Aiello
(74) *Attorney, Agent, or Firm* — Morgan, Lewis & Bockius LLP

(57) ABSTRACT

A method for predicting a clamp force using a convolutional neural network includes: generating a cepstrum image from a signal processing analysis apparatus; extracting a characteristic image by multiplying a predetermined weight value to pixels of the generated cepstrum image through artificial intelligence learning; extracting, as a representative image, the largest pixel from the extracted characteristic image; synthesizing an image by synthesizing the extracted representative image information; and predicting a clamp force by comparing the synthesized image with a predetermined value.

7 Claims, 3 Drawing Sheets

(51) Int. Cl.
*G06N 3/04* (2006.01)
*G06N 3/08* (2006.01)

(52) U.S. Cl.
CPC ........... *G06K 9/00536* (2013.01); *G06N 3/04* (2013.01); *G06N 3/08* (2013.01)

(58) Field of Classification Search
CPC ............. G06K 9/6232; G06K 9/00503; G06K 9/00523; G06K 9/0053; G06K 9/00536; G06F 11/2257; G06N 20/00; G06N 3/04; G06N 3/0454; G06N 3/08; G01L 1/24; G01L 5/24
USPC ..... 382/108, 272; 700/95; 702/84, 181, 183, 702/189, 193; 703/2
See application file for complete search history.

(56) References Cited

U.S. PATENT DOCUMENTS

| | | | | |
|---|---|---|---|---|
| 7,167,773 | B2* | 1/2007 | Schneider | B29C 35/0288 702/53 |
| 7,931,604 | B2* | 4/2011 | Even Zohar | G09B 23/28 703/2 |
| 2008/0267506 | A1* | 10/2008 | Winder | G06V 10/462 382/190 |
| 2013/0058746 | A1* | 3/2013 | Chase | B66F 9/22 414/621 |
| 2013/0267975 | A1* | 10/2013 | Timm | A61B 17/320068 606/169 |

\* cited by examiner

METHOD FOR PREDICTING CLAMP FORCE USING CONVOLUTIONAL NEURAL NETWORK

CROSS-REFERENCE(S) TO RELATED APPLICATIONS

This application claims priority to Korean Patent Application No. 10-2018-0160834, filed on Dec. 13, 2018 in the Korean Intellectual Property Office, which is incorporated herein by reference in its entirety.

TECHNICAL FIELD

Exemplary embodiments of the present disclosure relate to a method for predicting a clamp force using a convolutional neural network, and more particularly, to a method of predicting a clamp force using a convolutional neural network method of predicting a clamp force of a bolt.

BACKGROUND

A bolt is widely used as an important element for joining two or more parts. In particular, a bolt conforming to regulations must be used for joints of steel structures, and an clamp force of the bolt needs to be tightly controlled.

For instance, the Korean Industrial Standards (KS) classify types of bolts into Class A and Class B according to a torque coefficient, and specify an appropriate torque coefficient. The KS standards specify that an average value of the torque coefficient is appropriate to 0.11 to 0.15 for bolts in Class A, and an average value of the torque coefficient is appropriate to 0.15 to 0.19 for bolts in Class B.

A joint clamp force of the bolt may be calculated from a torque value, a torque coefficient and a diameter of the bolt, and a desired joint clamp force may be obtained by adjusting the torque value.

A fastening method is generally used to manage the clamp force of the bolt, which can be classified into a torque control method and a turn-of-the-nut method.

Since the turn-of-the-nut method uses the rotation angle of the nut, there is an advantage that the distribution of the clamp force is relatively small.

On the contrary, the torque control method has an advantage of excellent workability because the method determines the upper and lower limits of the torque value and tightens the bolt using a torque wrench.

However, the torque coefficient of the bolt is not kept constant, but may be changed due to various factors such as a length of the bolt, which is a physical factor, and a temperature, which is an environmental factor.

Therefore, the torque control method has a disadvantage that the distribution of the clamp force is large due to the change of the torque coefficient.

In addition, there is a disadvantage in that it is required to measure the clamp force of the bolt which is tightened by using a separate measuring device after tightening the bolt using the torque wrench.

Therefore, it is important to predict the clamp force of the bolt so that the bolt maintains a proper clamp force.

Various prediction techniques using artificial intelligence are emerging recently. Among them, a prediction technique using an artificial neural network for the clamp force of the bolt has been introduced.

In a method of calculating an clamp force using an artificial neural network in the related arts, a cepstral coefficient and a short-time Fourier transform (STFT) are derived from signals acquired by a sensor unit, respectively.

In the case of the cepstral coefficient, only a high frequency band of the acquired signal is extracted using a high-pass filter to reduce an effect on noise.

Then, a value is obtained by selecting a representative value in each frame, and then multiplying a weight value of each isosceles triangular distribution by several hundreds of divided frequency domains and then summing them.

The calculated value is taken with the log and subjected to discrete cosine transform to derive the cepstral coefficient.

In the case of the STFT, the acquired signal is transformed into frequency domain data having several hundreds of frames through a Fast Fourier Transform with a 50% overlap period based on a short time.

The characteristics of the cepstral coefficient and the STFT data are input as a supervised signal and a multi-layer weight matrix layer is formed through a slope descent method using a cost function, and an clamp force prediction value is indicated using the multi-layer weight matrix layer.

However, since such a conventional prediction technology is complicated, there is a problem in that real-time clamp force prediction is difficult and accuracy is low.

SUMMARY

An embodiment of the present disclosure is directed to provide a method for predicting a clamp force using a convolutional neural network which is simplified and enables prediction in real time by improving accuracy.

In accordance with an exemplary embodiment of the present disclosure, a method for predicting a clamp force using a convolutional neural network includes: generating a cepstrum image from a signal processing analysis apparatus; extracting a characteristic image by multiplying a predetermined weight value to pixels of the generated cepstrum image through artificial intelligence learning; extracting, as a representative image, the largest pixel from the extracted characteristic image; synthesizing an image by synthesizing the extracted representative image information; and predicting a clamp force by comparing the synthesized image with a predetermined value.

Adam optimization for optimizing the weight value may be applied between the synthesizing of the image and the predicting of the clamp force.

A loss function may be applied to the Adam optimization.

In the extracting of the characteristic image, a convolution filter may be applied.

In the extracting of the representative image, a pooling filter may be applied.

At least two convolution filters may be continuously applied.

The extracted representative image may be subjected to the extracting of the characteristic image at least once.

In accordance with another exemplary embodiment of the present disclosure, a method for predicting a clamp force using a convolutional neural network includes: generating a cepstrum image from a signal processing analysis apparatus; and predicting a clamp force by comparing the generated cepstrum image with a predetermined value.

According to the present disclosure, the following effects are obtained.

First, since the speed of data processing is fast while the size of the image is reduced, there is an advantage that real-time measurement is easy.

Second, since Adam optimization is applied, it is advantageous that accuracy of prediction is improved by reducing a loss value because the weight values are sufficiently updated when a path is continuously visited through iterative learning.

Third, it is advantageous to use the method in a real-time measurement system because the method is faster than a conventional slope descending method.

Fourth, since the size of signal is large during joining, there is an advantage that clear distinction is enabled when multi-step joining is performed at different speeds.

Fifth, there is an advantage that it is easy to derive a feature map using an image of a convolutional neural network because a clear distinction is made in the multi-step joining.

DESCRIPTION OF SPECIFIC EMBODIMENTS

Figure 1:
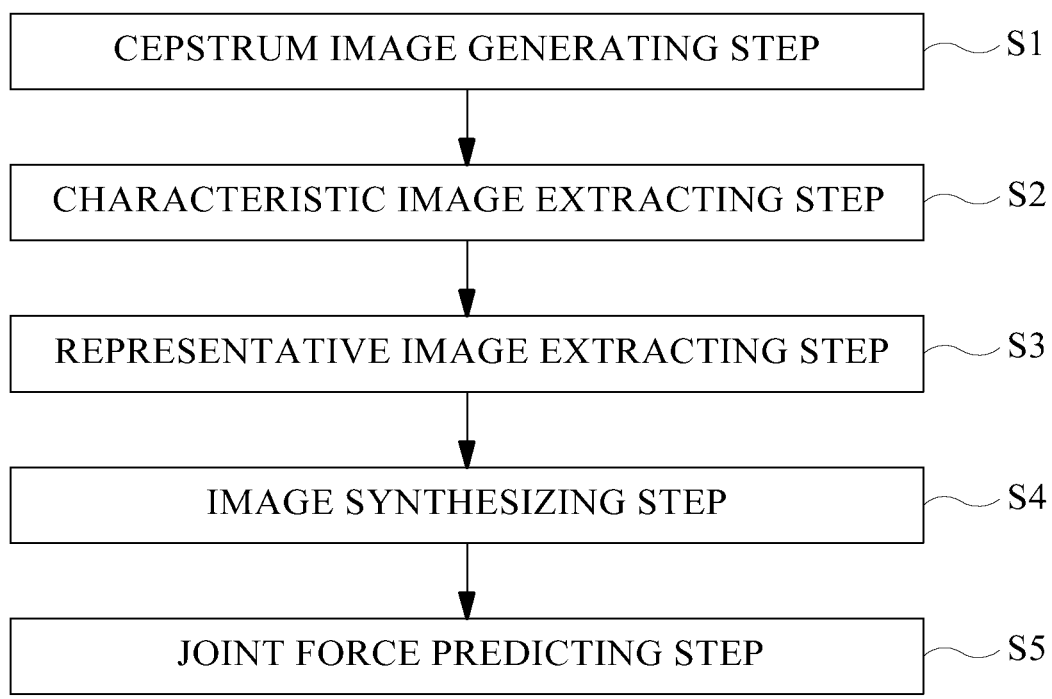
FIG. 1 is a flowchart according to an exemplary embodiment of the present disclosure.

The present disclosure may have various modifications and various embodiments and specific embodiments will be illustrated in the drawings and described in detail in the detailed description. However, this does not limit the present disclosure to specific embodiments, and it should be understood that the present disclosure covers all the modifications, equivalents and replacements included within the idea and technical scope of the present disclosure.

In describing each drawing, reference numerals refer to like elements.

Terms including as first, second, and the like are used for describing various constituent elements, but the constituent elements are not limited by the terms. The terms are used only to discriminate one constituent element from another component.

The terms are used only to discriminate one constituent element from another component. A term 'and/or' includes a combination of a plurality of associated disclosed items or any item of the plurality of associated disclosed items.

If it is not contrarily defined, all terms used herein including technological or scientific terms have the same meanings as those generally understood by a person with ordinary skill in the art.

Terms which are defined in a generally used dictionary should be interpreted to have the same meaning as the meaning in the context of the related arts, and are not interpreted as an ideal meaning or excessively formal meanings unless clearly defined in the present application.

A flow of a method for predicting a clamp force using a convolutional neural network according to an exemplary embodiment of the present disclosure will be described.

Figure 2:
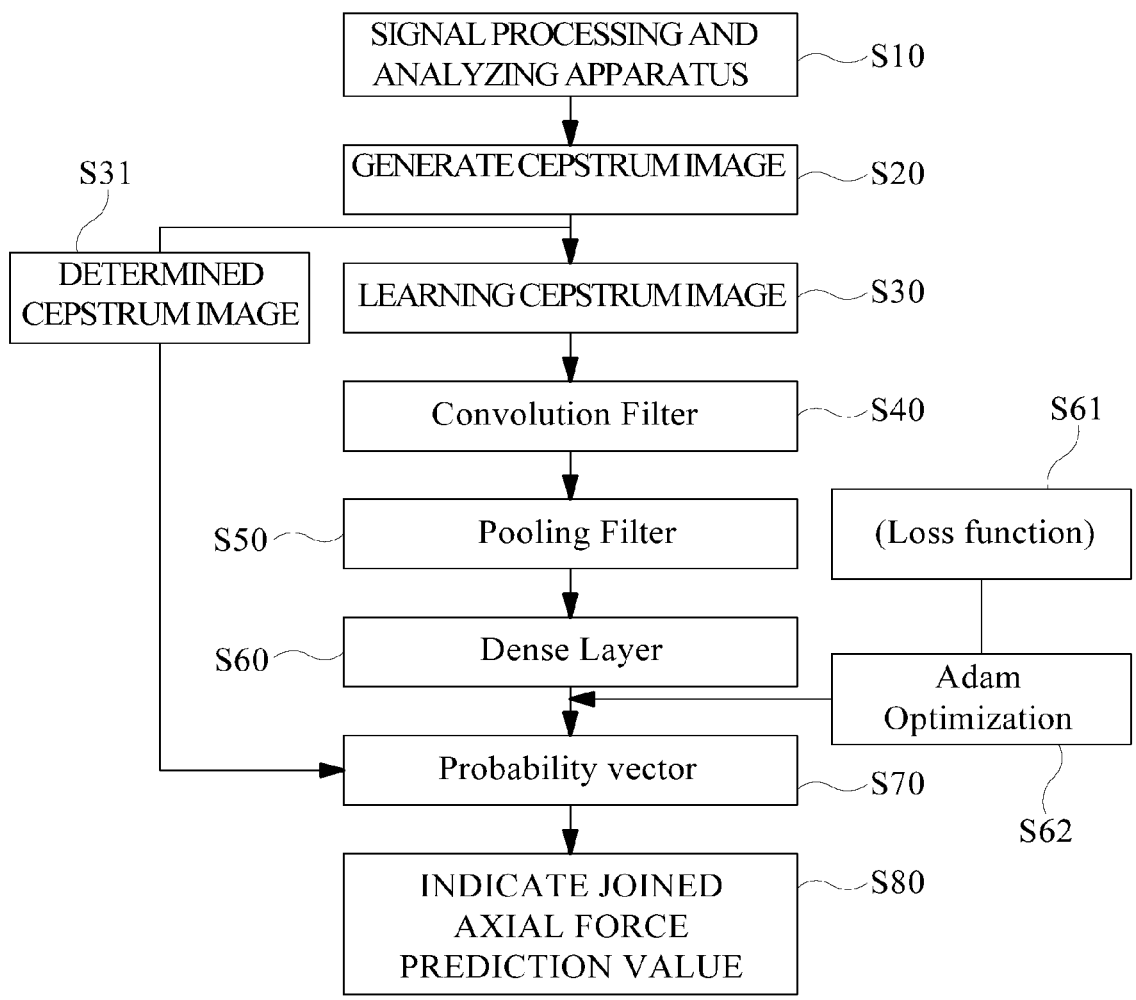
FIG. 2 is a configuration diagram of a convolutional neural network according to an exemplary embodiment of the present disclosure.
Figure 3:
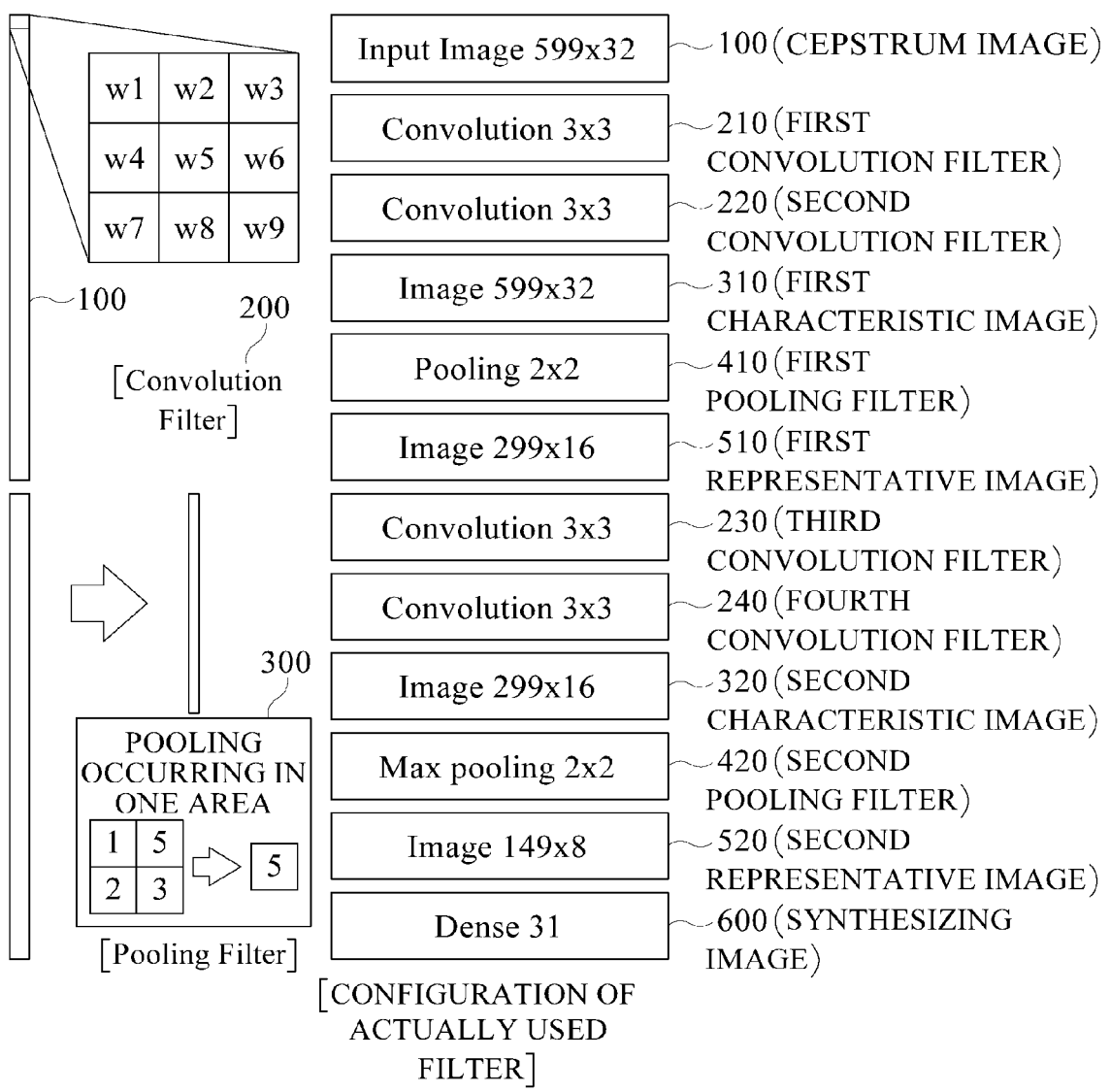
FIG. 3 is a configuration diagram of a filter according to an exemplary embodiment of the present disclosure.

FIG. 1 is a flowchart according to an exemplary embodiment of the present disclosure, FIG. 2 is a configuration diagram of a convolutional neural network according to an exemplary embodiment of the present disclosure and FIG. 3 is a configuration diagram of a filter according to an exemplary embodiment of the present disclosure.

First, in a cepstrum image generating step (S1), a cepstrum image is generated a signal processing analysis apparatus (S20).

The generated cepstrum image contains frequency change information as a pixel value as the clamp force of the acquired signal increases.

The cepstrum image may be obtained from the signal processing and analysis apparatus (510).

The learning cepstrum image (S30) may be obtained from the generated cepstrum image.

Next, in a characteristic image extracting step (S2), a characteristic image is extracted by multiplying a predetermined weight value by the pixel of the cepstrum image (S30) generated through artificial intelligence learning.

At this time, in the characteristic image extracting step (S2), a convolution filter (S40) may be applied.

The convolution filter is a small-sized filter and has a weight value to be multiplied by the image pixel.

More specifically, the convolution filter is one of layers of the convolutional neural network that is used to extract the input image.

A value of a matrix of the convolution filter in each deep learning is called a mask.

By using the convolution filter, the value of the mask through repetitive learning is changed to an appropriate value for distinction, thereby improving the accuracy of learning.

When the cepstrum image is input to the convolution filter, the filter is moved on the image and the characteristic image is extracted by multiplying a predetermined appropriate weight value.

The extracted characteristic image is input to a pooling filter (S50).

The pooling filter (S50) extracts only representative values among the pixel information.

More specifically, the pooling filter (S50) is used to derive the most significant value of the feature map derived through convolution and is used to reduce the size of the image.

When the extracted characteristic image passes through the pooling filter (S50), only the representative information is stored, and the size of the image is reduced.

At least two convolution filters may be continuously applied.

Next, in a representative image extracting step (S3), the largest pixel is extracted from the extracted characteristic image.

At this time, in the representative image extracting step (S3), a pooling filter may be applied.

The extracted representative image may be subject to the characteristic image extracting step at least once again.

Next, in an image synthesizing step (S4), a synthesis image is generated by synthesizing the extracted representative image information.

Finally, in a clamp force predicting step (S5), the predicted clamp force is indicated by comparing the synthesized image with a predetermined value (S80).

At this time, the information constituted by the representative values is finally synthesized by the dense layer, and the predicted value is indicated as a clamp force having the highest probability.

The predicted value is indicated as a clamp force-specific probability vector (S70).

On the other hand, Adam optimization (S62) may be applied for optimizing the weight value between the image synthesizing step (S4) and the clamp force predicting step (S5).

Since the minimum value is derived using an Adam optimizer, it is appropriate to be used in a real-time measurement system due to a faster speed than the conventional slope descending method.

At this time, a loss function (S61) may be applied to the Adam optimization (S62).

In other words, the Adam optimization technique helps in optimization of the convolution filter.

A filter with sufficient optimization has a weight value to effectively extract the characteristics of the image.

A configuration of the filter according to an exemplary embodiment of the present disclosure will be described below in detail with reference to FIG. 3.

A cepstrum image 100 is acquired as data measured from a component, and at this time, the size of the image is a size of 599×32 pixels.

The convolution filter 200 is applied to the entire image while a filter having a size of 3×3 moves to the right or down by one space to extract a characteristic of the cepstrum change.

More specifically, a first convolution filter 210 and a second convolution filter 220 may be continuously applied as the convolution filter 200.

The size of a first characteristic image 310 extracted from the convolution filter 200 is maintained at a size of 599×32 pixels.

The first characteristic image 310 is input to a first pooling filter 410.

The pooling filter 400 may sequentially include a first pooling filter 410 and a second pooling filter 420.

When the first characteristic image 310 subjected to the convolution enters the pooling filter 400, all regions of the image are divided into 2×2 regions, and the largest pixel value in each region is extracted.

This value is a first representative image 510.

That is, since only one representative image value is obtained from four values as illustrated in the drawing, the horizontal and vertical sizes of the image is reduced by half.

The first representative image 510 is again derived as a second characteristic image 320 through the third convolution filter 230 and the fourth convolution filter 240.

The second characteristic image 320 passes through the second pooling filter 420 again to obtain a second representative image 520.

A synthesis image 600 becomes 1 by synthesizing image information of the dense layer (S60) to measure the similarity with each class among 31 classes of 50 kN to 81 kN and add the similarities.

In the clamp force predicting step (S5), the class having the highest similarity among the measured similarities is confirmed as a determined clamp force.

As such, the first convolution filter 210 and the second convolution filter 220 may be doubly used as the convolution filter 200.

As such, a multi-filter structure may be applied, in which the characteristic images obtained by the first convolution filter 210 and the second convolution filter 220 are provided to the first pooling filter 410 and the characteristic images obtained by the third convolution filter 230 and the fourth convolution filter 240 are provided to the second filter 420.

In other words, it a multi-filter structure may be applied using a triple filter structure that is a combination of the double convolution filter and the pooling filter.

In this way, deep characteristics may be extracted by stacking the convolution filters in multiple layers.

In addition, important information may be stored in a smaller image by using the pooling filter at least once, thereby improving the speed and accuracy of real-time prediction.

The method for predicting the clamp force using the convolutional neural network according to the exemplary embodiment of the present disclosure can be constituted by a cepstrum image generating step (S31) of generating a cepstrum image from the signal processing analysis apparatus and a predicting step (S80) of indicating a predicted clamp force by comparing the generated cepstrum image with a predetermined value.

What is claimed is:

1. A method for predicting a clamp force using a convolutional neural network, the method comprising:
generating a cepstrum image containing frequency change information as a pixel value and processed from measured data from a component by a signal processing analysis apparatus;
extracting a characteristic image multiplied by a predetermined weight value to pixels of the generated cepstrum image through artificial intelligence learning;
extracting, as a representative image, a largest pixel from the extracted characteristic image;
synthesizing an image by synthesizing the extracted representative image by a dense layer; and
predicting a clamp force by comparing a similarity of the synthesized image with a predetermined value;
indicating the predicted clamp force having a highest similarity; and
selecting a bolt based on the predicted clamp force.

2. The method of claim 1, wherein an Adam optimization for optimizing the predetermined weight value is applied between the synthesizing of the image and the predicting of the clamp force.

3. The method of claim 2, wherein a loss function is applied to the Adam optimization.

4. The method of claim 1, wherein in the extracting of the characteristic image, a convolution filter is applied.

5. The method of claim 1, wherein in the extracting of the representative image, a pooling filter is applied.

6. The method of claim 4, wherein at least two convolution filters are continuously applied.

7. The method of claim 6, wherein the extracted representative image is subjected to the extracting of the characteristic image at least once.

* * * * *